United States Patent
Hudson et al.

(10) Patent No.: US 9,434,424 B2
(45) Date of Patent: Sep. 6, 2016

(54) MOUNTING CLIP FOR VEHICLE BODY TO FRAME

(71) Applicant: International Truck Intellectual Property Company, LLC, Lisle, IL (US)

(72) Inventors: Bryan Hudson, Beggs, OK (US); Raymond William Baggett, Naperville, IL (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 113 days.

(21) Appl. No.: 14/184,153

(22) Filed: Feb. 19, 2014

(65) Prior Publication Data

US 2015/0233402 A1 Aug. 20, 2015

(51) Int. Cl.
| | | |
|---|---|---|
| F16B 2/20 | (2006.01) | |
| B60R 1/04 | (2006.01) | |
| B62D 33/077 | (2006.01) | |
| B62D 27/02 | (2006.01) | |
| B62D 65/02 | (2006.01) | |

(52) U.S. Cl.
CPC ............ *B62D 33/077* (2013.01); *B62D 27/02* (2013.01); *B62D 65/02* (2013.01); *Y10T 24/44009* (2015.01)

(58) Field of Classification Search
CPC ............ B60J 11/06; B60J 1/006; B60J 1/10; B60J 7/123; B60J 7/1252; B60N 2/015; B62D 33/0604; B62D 24/02; B62D 27/04; B62D 27/065; B62D 25/20; B62D 33/067; B62D 21/02
USPC ...................... 267/248, 286, 141.2, 293, 140; 296/65.03, 35.1, 190.7, 204, 29, 181.2, 296/35.3
See application file for complete search history.

(56) References Cited

U.S. PATENT DOCUMENTS

| | | | | |
|---|---|---|---|---|
| 4,673,967 A * | 6/1987 | Hingorany | ........... | H01L 23/3107 174/555 |
| 5,199,834 A * | 4/1993 | Seidl | ...................... | B60R 21/215 280/728.2 |
| 5,644,852 A * | 7/1997 | Fuller | ....................... | B44D 3/38 33/393 |
| 7,411,763 B2 * | 8/2008 | Wu | ....................... | G11B 5/4846 360/264.2 |
| 7,503,553 B2 | 3/2009 | Brannan | | |
| 7,758,060 B2 * | 7/2010 | Lopez | .................... | B60D 1/488 280/495 |
| 2010/0270819 A1 * | 10/2010 | Gustafsson | ............ | B62D 24/02 296/29 |
| 2011/0298239 A1 * | 12/2011 | Crane | .................... | B62D 27/00 296/35.1 |
| 2013/0168989 A1 * | 7/2013 | Sasage | ................... | B62D 27/04 296/35.1 |

OTHER PUBLICATIONS

US Truck Body, Installation and Safety Manual—Recommendations for Mounting Truck Bodies to Truck Chassis.

* cited by examiner

*Primary Examiner* — Glenn Dayoan
*Assistant Examiner* — Sunsurraye Westbrook
(74) *Attorney, Agent, or Firm* — Jeffrey P. Calfa; Mark C. Bach

(57) ABSTRACT

A mounting clip for attaching a vehicle body to a frame using a tool includes a generally J-shaped body having a frame attaching portion configured to be attached to the vehicle body, and a hook portion extending from the frame attaching portion and configured to engage the frame. At least one fastener hole is disposed on the frame attaching portion. A positioning formation is disposed on the frame attaching portion, where the positioning formation is configured to receive a tool.

6 Claims, 6 Drawing Sheets

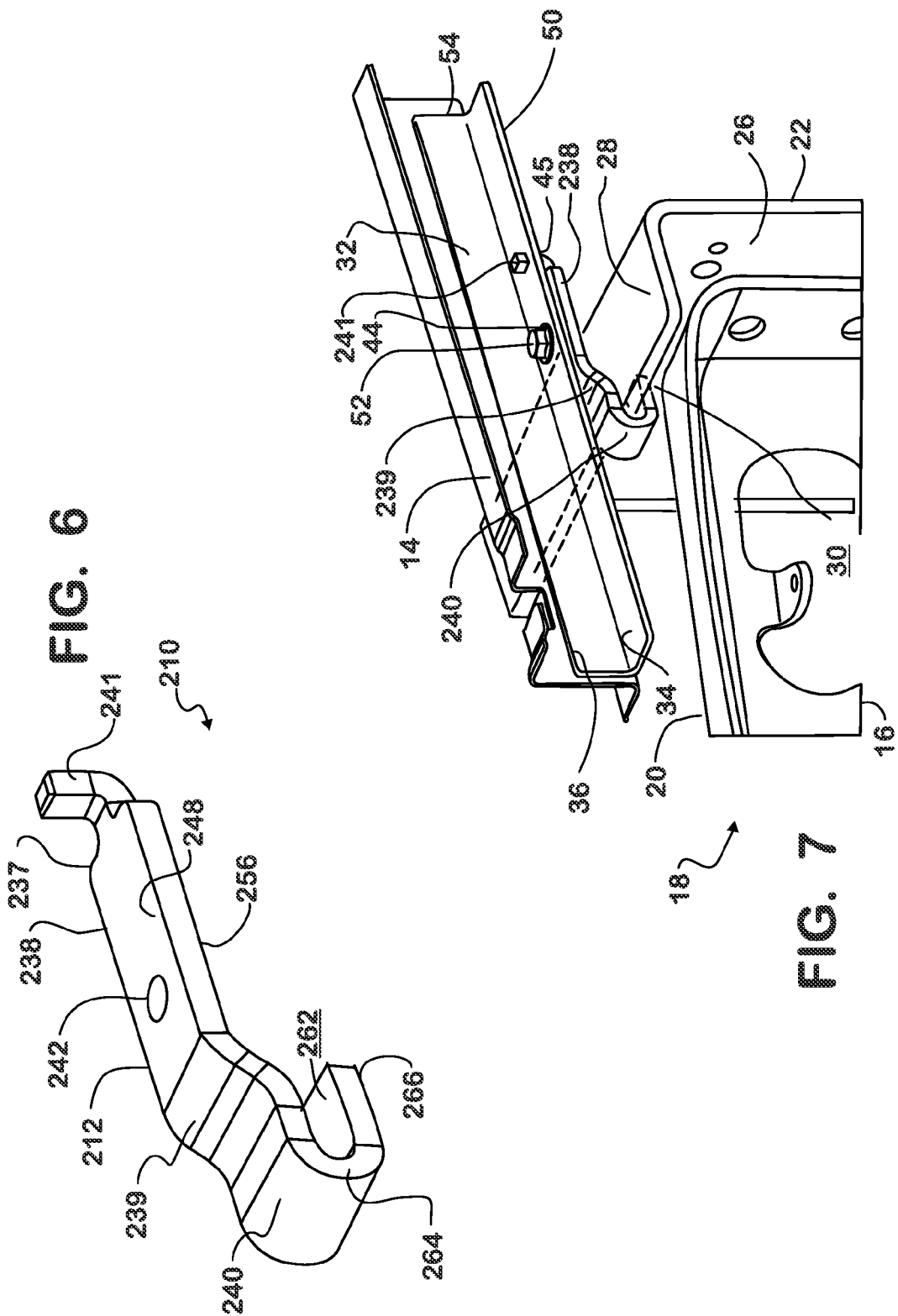

MOUNTING CLIP FOR VEHICLE BODY TO FRAME

BACKGROUND

Embodiments described herein relate generally to a mounting device, and more particularly, to a clip for mounting a vehicle body to a vehicle frame.

In trucks, buses and other vehicles, a frame having frame rails typically spans the length of the vehicle. A vehicle body is attached to the frame. The vehicle body is typically attached to the frame by welds between the vehicle body and the frame, or by attachment clips that are either bolted or welded to the frame and to the vehicle body. In conventional vehicle body to frame mounting, the clip is attached to the vehicle body and to the frame from inboard of the frame rails. Attaching the clip to the frame rails at a location inboard of the frame rails may be a difficult location for the manufacturer to access, and attachment of the clip inboard of the frame rails may also interfere with gas tanks, cross-members, rear axles, suspension components and other vehicle components.

SUMMARY

A mounting clip for attaching a vehicle body to a frame using a tool includes a generally J-shaped body having a frame attaching portion configured to be attached to the vehicle body, and a hook portion extending from the frame attaching portion and configured to engage the frame. At least one fastener hole is disposed on the frame attaching portion. A positioning formation is disposed on the frame attaching portion, where the positioning formation is configured to receive a tool.

A mounting clip for attaching a vehicle body to a frame using a tool includes a generally J-shaped body having a frame attaching portion configured to be attached to the vehicle body, a neck portion extending from the frame attaching portion, and a hook portion extending from the neck portion and configured to engage the frame, wherein the neck portion has an offset such that the frame attaching portion is non-planar with any portion of the hook portion; and at least one fastener hole disposed on the frame attaching portion.

A mounting clip for attaching a vehicle body to a frame using a tool includes a generally J-shaped body having a frame attaching portion configured to be attached to the vehicle body, and a hook portion extending from the frame attaching portion and configured to engage the frame. At least one fastener hole is disposed on the frame attaching portion. A clamp block is configured to be disposed between the frame and the frame attaching portion, or between the frame and the hook portion.

BRIEF DESCRIPTION OF THE DRAWINGS

FIG. 6 is a perspective view of a third embodiment of the mounting clip.

FIG. 7 is a perspective view of the third embodiment of the mounting clip attached to the frame and to the vehicle body.

DETAILED DESCRIPTION

Figure 1:
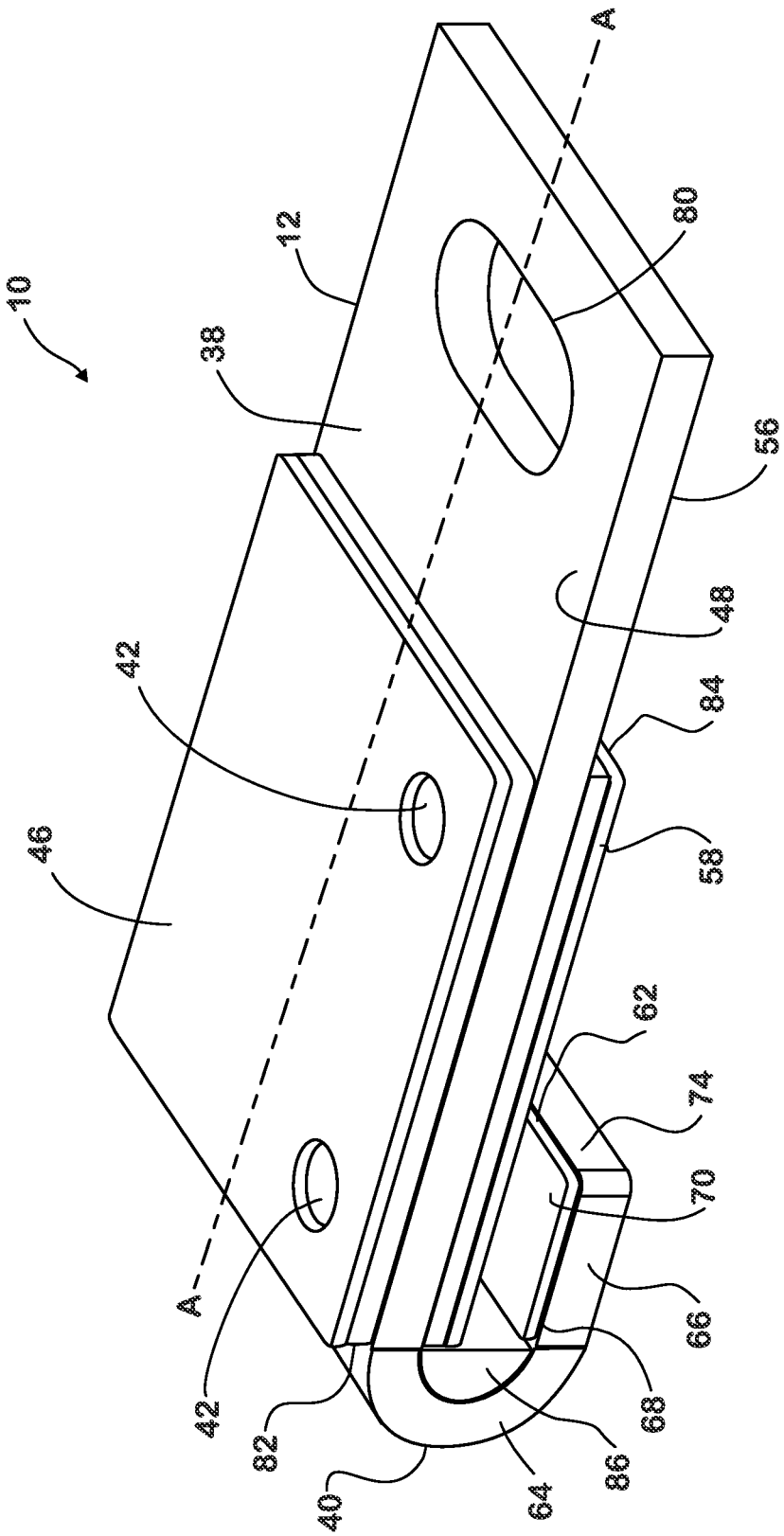
FIG. 1 is a perspective view of a first embodiment of a mounting clip.

Referring to FIGS. 1-9, a mounting clip 10, 110, 210, 310 includes a generally J-shaped clip body 12, 112, 212, 312 that is attachable to a vehicle body 14 and to a frame 16 of a bus, truck or other vehicle 18. The frame 16 includes frame rails 20 that may extend substantially the length of the vehicle 18. A frame bracket 22 is attached to frame rails 20 prior to drop of the vehicle body 14, and the frame bracket 22 receives the mounting clip 10, 110, 210, 310 for coupling the vehicle body 14 to the frame 16. Generally C-shaped, the frame bracket 22 may be bolted to the frame rail 20 at fastener holes 24 on a web 26 of the frame bracket, and at least one flange 28 of the frame bracket may extend generally perpendicular to the web 26 and generally parallel to the frame fail. Between the top surface of the frame rail 20 and the flange 28, a receiving space is formed 30 (see FIG. 3).

Attached to the vehicle body 14, for example the floor sill, is a body bracket 32 that may be generally L-shaped, however other configurations are possible. The body bracket 32 may be attached to the vehicle body 14 by spot welds, fasteners, or any other method of attachment. A first leg 34 of the body bracket 32 extends generally parallel with the flange 28 of the frame bracket 22. A second leg 36 may extend generally perpendicularly from the first leg 34, and is configured to abut the vehicle body 14. The second leg 36 may be coextensive with the vehicle body 14 and may distribute the load along the vehicle body, for example the floor sill. For purposes of this application, once attached to the vehicle body 14, the body bracket 32 is considered a component of the vehicle body, and once the frame bracket 22 is attached to the frame rail 20, the frame bracket is considered a component of the frame 16.

As will be explained below, the mounting clip 10, 110, 210, 310 couples the vehicle body 14 to the frame 16 using the frame bracket 22. Also, the mounting clip 10, 110, 210 couples the frame 16 to the vehicle body 14 using the body bracket 32. Both the frame bracket 22 and the body bracket 32 may be attached to the frame 16 and the vehicle body 14, respectively, before the vehicle body is dropped onto the frame. When the mounting clip 10, 110, 210, 310 is received on the frame bracket 22, the mounting clip is fastened to the vehicle body 14 using fasteners that are inserted from outboard of the frame rails 20.

While the mounting clip 10, 110, 210, 310 will be explained with reference to use on the vehicle body 14 and the frame 16 of the vehicle 18, it should be appreciated that the clip may be used in any vehicle or application where a large body is to be attached to a supporting frame.

Figure 2:
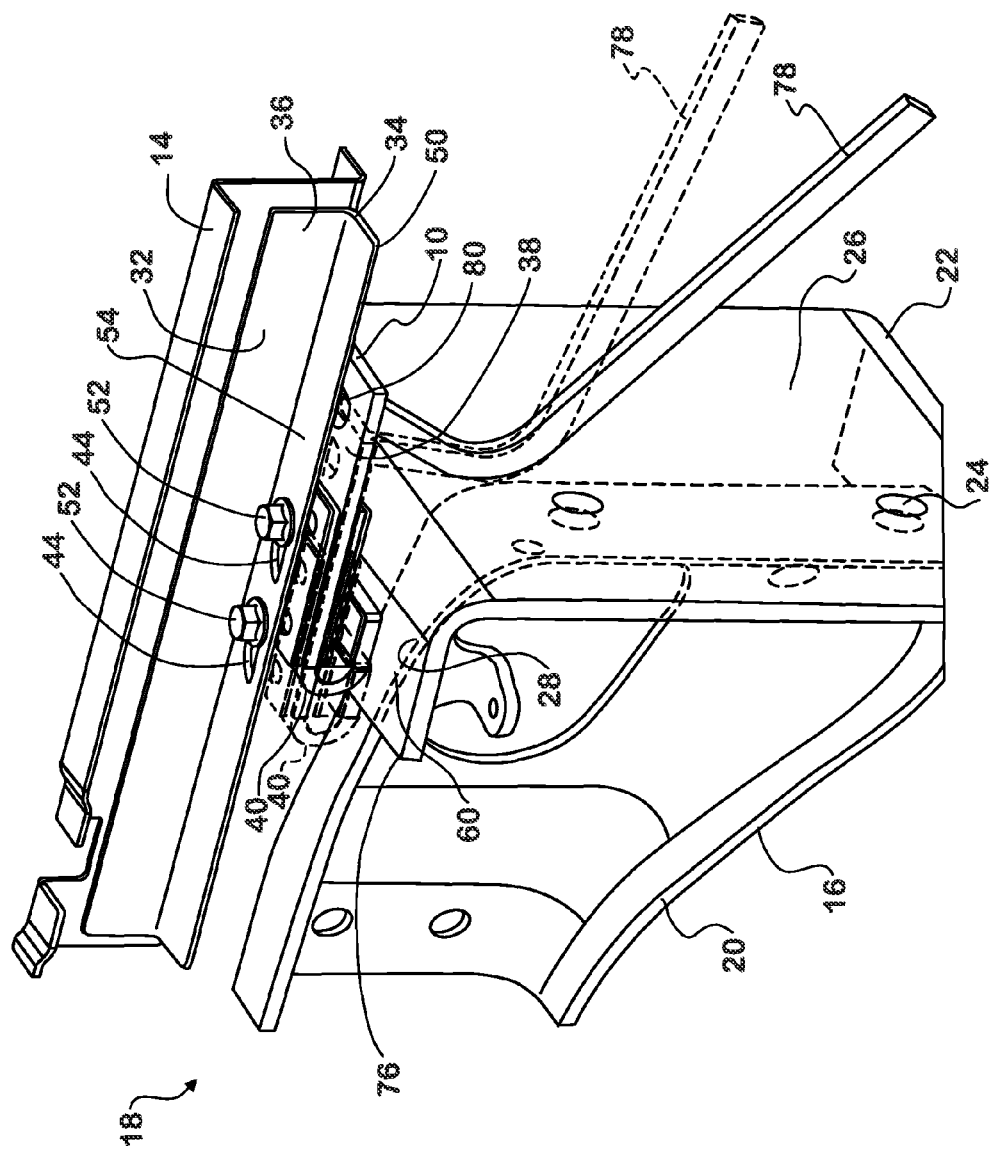
FIG. 2 is a perspective view of the first embodiment of the mounting clip attached to a frame and to a vehicle body, with the mounting clip shown in a first position in phantom, and the mounting clip shown in a second position in solid.
Figure 3:
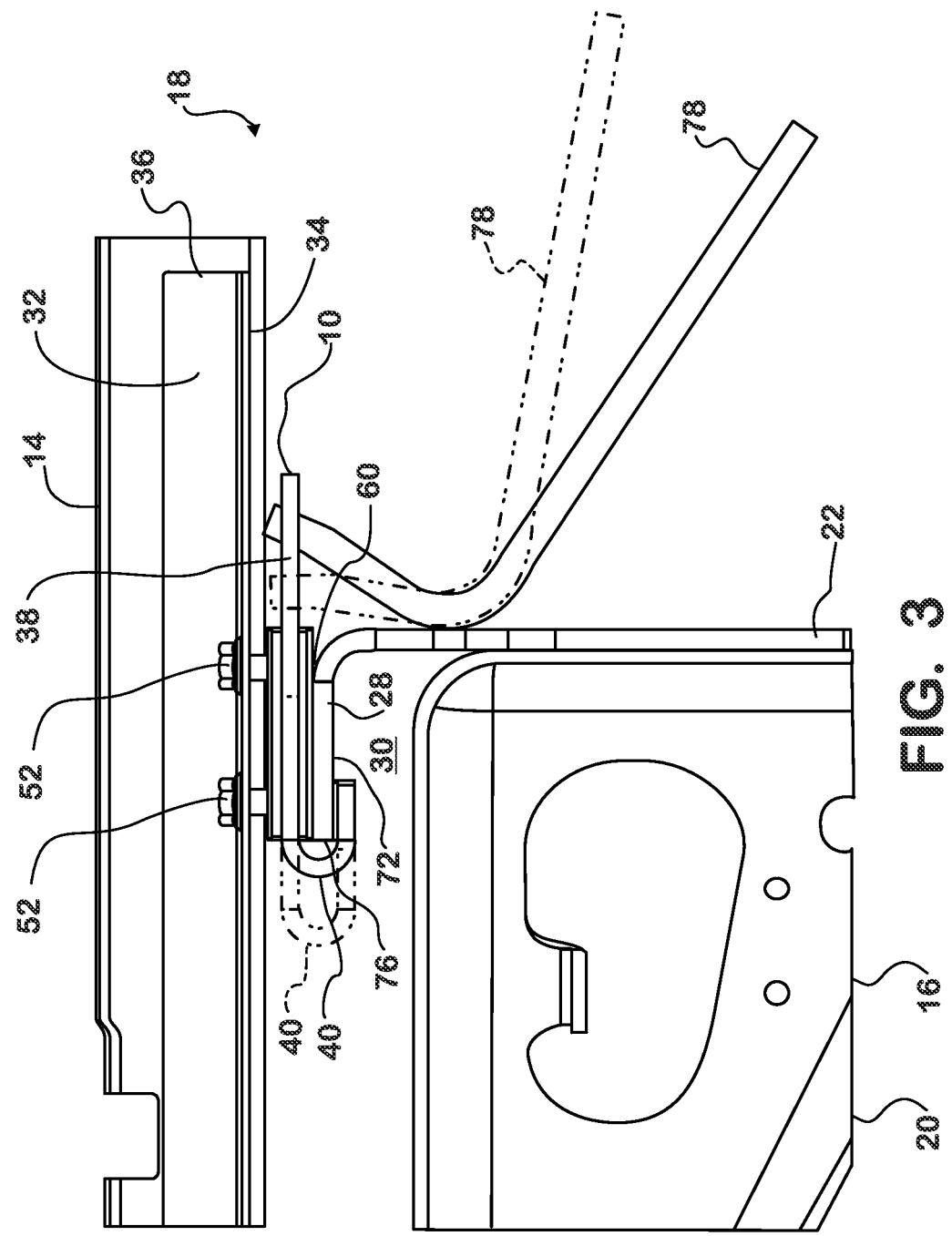
FIG. 3 is a side view of the first embodiment of the mounting clip attached to the frame and to the vehicle body, with the mounting clip shown in the first position in phantom, and the mounting clip shown in the second position in solid.

Referring now to FIGS. 1-3, the first embodiment of mounting clip 10 has a generally J-shaped clip body 12 with a generally elongate and planar frame attaching portion 38 and a hook portion 40 extending from the frame attaching portion. The frame attaching portion 38 may include at least one fastener hole 42 that is alignable with at least one fastener hole 44 on the first leg 34 of body bracket 32. In the mounting clip 10 and vehicle body 14 of FIGS. 1-3, there are two fastener holes 42 that configured to be alignable with two fastener holes 44 on the body bracket 32. The fastener hole 44 on the body bracket 32 may be generally a generally elongate slot, however other configurations that allow fastener movement within the fastener hole are possible.

The frame attaching portion 38 may also include a first pad 46 on at least a portion of an upper surface 48 of the frame attaching portion. The fastener holes 42 may extend through the first pad 46. The frame attaching portion 38 may engage a bottom surface 50 of the first leg 34 of the body bracket 32 at the first pad 46. When the frame attaching portion 38 is attached to the body bracket 32, a fastener 52 is inserted from a top surface 54 through the first leg 34, and is received in the mounting clip 10. It is possible that the fastener hole 42 is threaded to receive the fastener 52. The fastener holes 42 may be offset from a longitudinal axis A, and non-central on the frame attaching portion 38 to facilitate attachment outboard from the frame rails 20. As can be seen in FIG. 2, the fasteners 52 are inserted from outboard from the frame rails 20.

On a lower surface 56 of the frame attaching portion 38, a second pad 58 on the frame attaching portion 38 extends along at least a portion of the frame attaching portion. The second pad 58 is configured to engage a top surface 60 of the flange 28.

Extending from the frame attaching portion 38 is the hook portion 40 that is generally curved about 180-degrees to define a receiving channel 62 between the hook portion and the frame attaching portion. The hook portion 40 is configured to engage the flange 28. The hook portion 40 may be curved, or alternately may be straight-line segments, or alternately, may be any shape that mechanically engages the flange 28 to couple the mounting clip 10 to the frame bracket 22. In the mounting clip 10, the hook portion 40 has a generally curved segment 64 and a generally linear segment 66. On an interior surface 68 of the linear segment 66, a third pad 70 may be configured to engage a bottom surface 72 of the flange 28.

The first pad 46, the second pad 58 and the third pad 70 may be formed of a rubber or other material, for example a 90 durometer rubber, for reducing friction between the mounting clip 10 and the flange 28, and for reducing friction between the mounting clip and the first leg 34.

Referring to FIG. 1, the mounting clip 10 may also include a fourth pad 82 and a fifth pad 84, where the fourth pad is located between the first pad 46 and the frame attaching portion 38, and where the fifth pad is located between the second pad 58 and the frame attaching portion. The fourth pad 82 and the fifth pad 84 may be a rubber or other material that may be relatively softer than the first pad 46 and the second pad 58, for example a 70 durometer rubber. The fourth pad 82 and the fifth pad 84 may act as an isolator. Additionally, a sixth pad 86 may be disposed at the curved segment 64.

During assembly, the mounting clip 10 may be attached to the body bracket 32 prior to dropping of the vehicle body 14 onto the frame 16. The fastener 52 is inserted through the first leg 34 of the body bracket 32 and into the mounting clip 10. The fastener 52 is in a loosened state within the slot of the fastener hole 44 such that some relative movement of the mounting clip 10 relative to the first leg 34 can occur due to the fastener 52 having some relative movement within the slotted fastener hole 44. The mounting clip 10 is moved relative to the first leg 34 such that the hook portion is in a forward, first position (shown in phantom). In the forward position, the hook portion 40 is extended generally parallel with the frame rail 20 and an end 74 of the hook portion can clear an end 76 of the flange 28 when the vehicle body 12 and the mounting clip 10 are lowered onto the frame bracket 22. The vehicle body 12 is lowered onto the frame 16 such that the vehicle body is aligned with the frame. After the vehicle body 12 and the mounting clip 10 are lowered onto the frame bracket 22, a tool 78, such as a lever, can be inserted into a positioning formation 80, such as an opening, or any other formation configured to receive the lever, to position the mounting clip 10 to the second position (shown in solid). The tool 78 may be a lever, however other tools may be used. Displacing the mounting clip 10 in the direction outward from or exterior to the frame bracket 22 introduces the flange 28 into the receiving channel 62 of the hook portion 40, and introduces the linear segment 66 into the receiving space 30 between the flange and the frame rail 20. During displacement to the second position, the fasteners 52 slide in the slot of the fastener hole 44. When the hook portion 40 engages the flange 28 in the second position, the fasteners 52 are tightened. Tightening of the fasteners 52 occurs outboard of the frame rails 20.

The clip body 12 may be integrally formed, such as roll-formed or stamped, however the body may also be formed in multiple components. The clip body 12 may be ¼-inch steel, however other materials and widths are possible.

Figure 4:
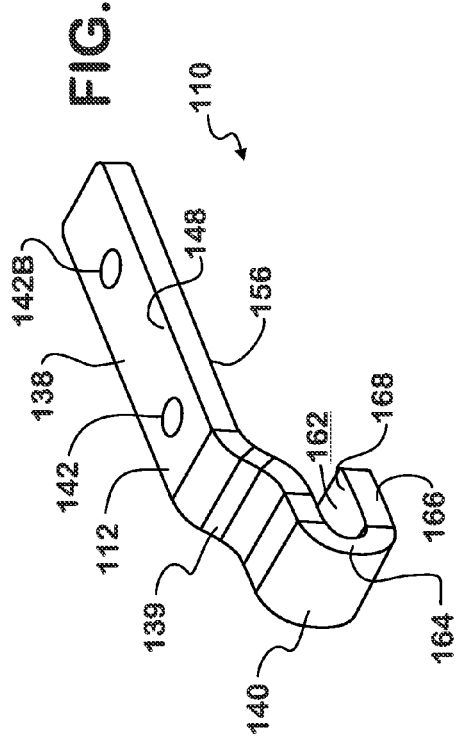
FIG. 4 is a perspective view of a second embodiment of the mounting clip.
Figure 5:
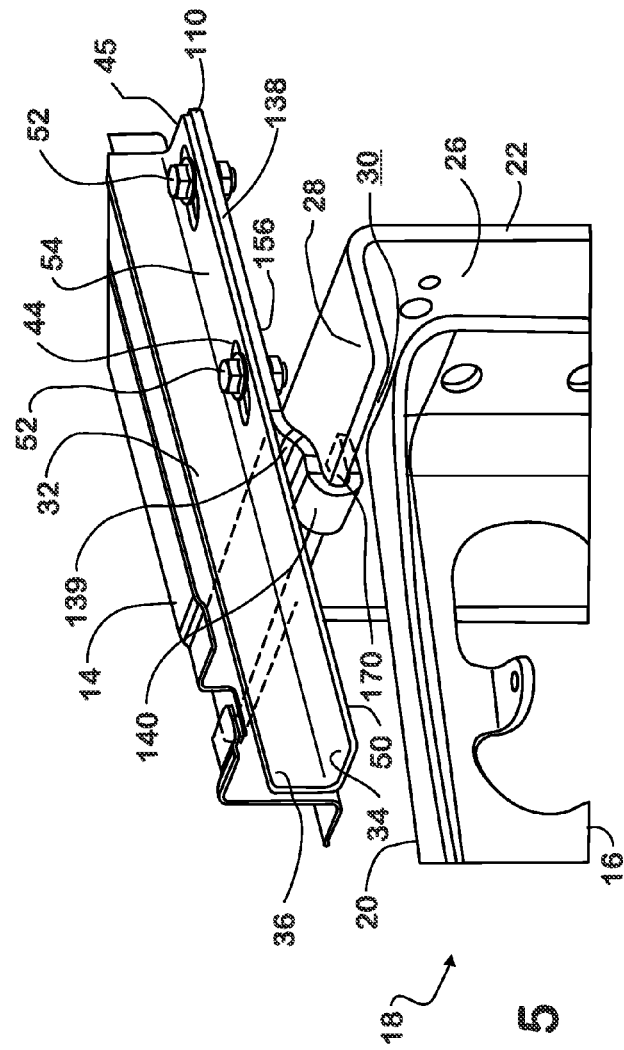
FIG. 5 is a perspective view of the second embodiment of the mounting clip attached to the frame and to the vehicle body.

Referring now to FIGS. 4-5, a second embodiment of mounting clip 110 has a generally J-shaped clip body 112 with a generally elongate and planar frame attaching portion 138, a neck portion 139 extending from the frame attaching portion 138, and a hook portion 140 extending from the neck portion.

The frame attaching portion 138 may include at least one fastener hole 142 that is alignable with at least one fastener hole 44 on the first leg 34 of body bracket 32. The fastener holes 142 may be located generally centrally along the longitudinal axis of the clip body 112, or may be offset. In the mounting clip 110 and vehicle body 14 of FIGS. 4-5, there are two fastener holes 142 that configured to be alignable with two fastener holes 44 on the body bracket 32. The first fastener hole 44 on the body bracket 32 may be generally a generally elongate slot, however other configurations are possible. A second fastener hole 45 is not generally elongate and is used to pin the mounting clip 110 relative to the body bracket 32. The fastener holes 142 may extend through the frame attaching portion 138.

The frame attaching portion 138 may engage a bottom surface 50 of the first leg 34 of the body bracket 32. When the frame attaching portion 138 is attached to the body bracket 32, a fastener 52 is inserted from a top surface 54 through the fastener hole 45 and through the rear fastener hole 142B on the mounting clip 110. The mounting clip 110 can be attached to the body bracket 32 before the body is dropped onto the frame 16.

Extending from the frame attaching portion 138 is the neck portion 139. The neck portion 139 has an offset for permitting the fastening of the fastener 52 on a lower surface 156 of the frame attaching portion 138. The offset of the neck portion results in the upper surface 148 of the frame attaching portion 138 laying in a different plane than any portion of the hook portion 140.

Extending from the neck portion 139 is the hook portion 140 that is generally curved about 180-degrees to define a receiving channel 162 between the hook portion and the frame attaching portion. The hook portion 140 is configured to engage the flange 28. The hook portion 140 may be curved, or alternately may be straight-line segments, or alternately, may be any shape that mechanically engages the flange 28 to couple the mounting clip 110 to the frame bracket 22. In the mounting clip 110, the hook portion 140 has a generally curved segment 164 and a generally linear segment 166. On an interior surface 168 of the hook portion 140, a pad 170 may be configured to engage the flange 28.

During assembly, the mounting clip 110 may be attached to the body bracket 32 prior to dropping of the vehicle body 14 onto the frame 16. The fastener 52 is inserted through the first leg 34 of the body bracket 32 and into the mounting clip 10 at the rear fastener hole 142B. During the drop, the vehicle body 14 and the attached mounting clip 110 are moved relative to the frame 16 to receive the flange 28 in the receiving channel 162 of the hook portion 140. The mounting bracket 110 may be pivotable about the fastener 52 in the rear fastener hole 142. When the flange 28 is received in the hook portion 140, the fastener 52 that is received in the forward fastener hole 142 can be tightened. As can be seen in FIG. 5, the fasteners 52 are inserted and tightened from outboard of the frame rails 20.

The clip body 112 may be integrally formed, such as roll-formed or stamped, however the body may also be formed in multiple components. The clip body 112 may be ¼-inch steel, however other materials and widths are possible.

Referring now to FIGS. 6-7, a third embodiment of mounting clip 210 has a generally J-shaped clip body 212 with a generally elongate and planar frame attaching portion 238, a neck portion 239 extending from the frame attaching portion 238, and a hook portion 240 extending from the neck portion. At a first end 237 of the frame attaching portion 238, a non-circular tail 241 is configured to be received in the second fastener hole 45 on the body bracket 32. The tail 241 may be a square in cross-section to provide an anti-rotation feature, however other configurations are possible. The 241 tail extends generally perpendicularly from the frame attaching portion 238 and is configured to resist rotation of the mounting clip 210 relative to the vehicle body 14. Further, the tail 241 may be disposed anywhere along the length of the frame attaching portion 238.

The frame attaching portion 238 may include at least one fastener hole 242 that is alignable with at least one fastener hole 44 on the first leg 34 of body bracket 32. In the mounting clip 210 and vehicle body 14 of FIGS. 6-7, there is one fastener hole 242 that configured to be alignable with the fastener hole 44 on the body bracket 32. The fastener hole 242 may extend through the frame attaching portion 238.

An upper surface 248 of the frame attaching portion 238 may engage a bottom surface 50 of the first leg 34 of the body bracket 32. When the frame attaching portion 238 is attached to the body bracket 32, the tail 241 is received in the fastener hole 45 and a fastener 52 is inserted from a top surface 54 through the fastener hole 44 and through the fastener hole 242 on the mounting clip 210.

Extending from the frame attaching portion 238 is the neck portion 239. The neck portion 239 has an offset for permitting the fastening of the fastener 52 on a lower surface 256 of the frame attaching portion 238. As can be seen in FIG. 7, the fastener 52 may be tightened from outboard of the frame rails 20.

Extending from the neck portion 239 is the hook portion 240 that is generally curved about 180-degrees to define a receiving channel 262 between the hook portion and the frame attaching portion. The hook portion 240 is configured to engage the flange 28. The hook portion 240 may be curved, or alternately may be straight-line segments, or alternately, may be any shape that mechanically engages the flange 28 to couple the mounting clip 210 to the frame bracket 22. In the mounting clip 210, the hook portion 240 has a generally curved segment 264 and a generally linear segment 266.

During assembly, the receiving channel 262 of the hook portion 240 receives the flange 28. When the flange 28 is received in the hook portion 240, the fastener 52 that is received in the fastener hole 242 can be tightened.

The clip body 212 may be integrally formed, such as roll-formed or stamped, however the body may also be formed in multiple components. The clip body 212 may be ¼-inch steel, however other materials and widths are possible.

Figure 8:
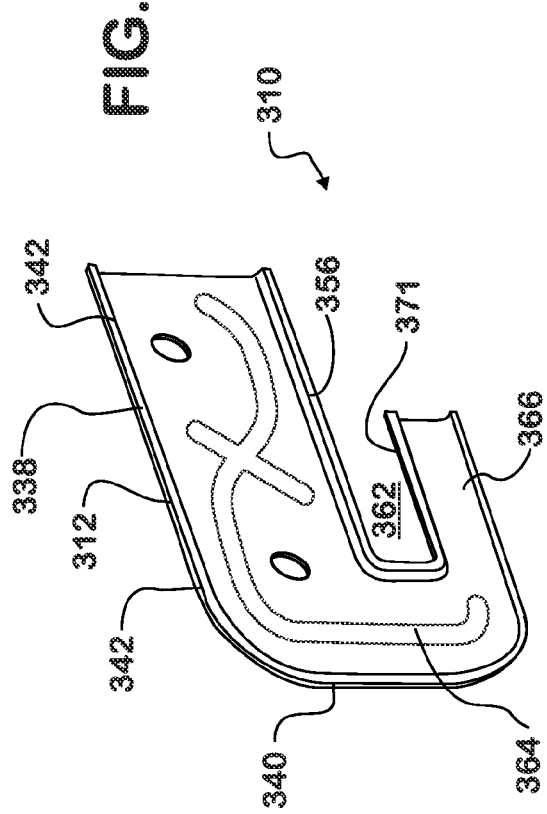
FIG. 8 is a perspective view of the fourth embodiment of the mounting clip.
Figure 9:
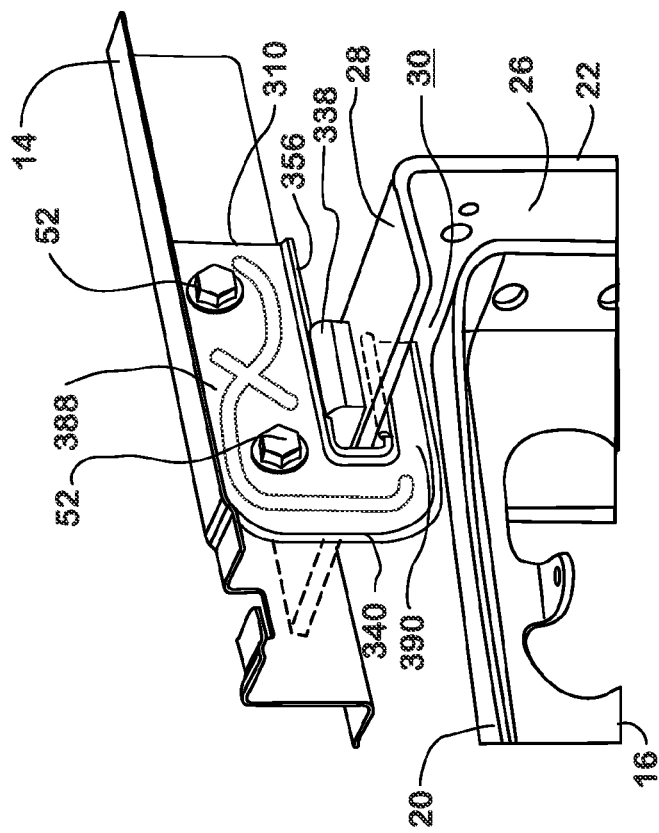
FIG. 9 is a perspective view of the fourth embodiment of the mounting clip attached to the frame and to the vehicle body.

Referring now to FIGS. 8-9, a fourth embodiment of mounting clip 310 has a generally J-shaped body 312 with a generally elongate and planar frame attaching portion 338, and a hook portion 340 extending from the neck portion. The clip body 312 may be a stamped plate, where the planar surface of the plate body 312 engages the vehicle body 14, however other configurations are possible.

The frame attaching portion 338 may include at least one fastener hole 342 that is alignable with at least one fastener hole 44 on the vehicle body 14. In the mounting clip 310 and vehicle body 14 of FIGS. 8-9, there are two fastener holes 342 that configured to be alignable with the fastener holes 44 on the vehicle body 14. The fastener holes 342 may be offset with respect to each other and with respect to a longitudinal axis of the frame attaching portion 338. Alternately, the fastener holes 342 may be generally parallel with a top surface of the frame attaching portion. The fastener hole 342 extends through the frame attaching portion 338, and the frame attaching portion may engage directly with the vehicle body 14.

Extending from the frame attaching portion 338 is the hook portion 340 that is generally curved about 180-degrees to define a receiving channel 362 between the hook portion and the frame attaching portion. The hook portion 340 is configured to engage the flange 28. The hook portion 340 may be curved, or alternately may be straight-line segments, or alternately, may be any shape that mechanically engages the flange 28 to couple the mounting clip 310 to the frame bracket 22. In the mounting clip 310, the hook portion 340 has a generally curved segment 364 and a generally linear segment 366.

During assembly, the receiving channel 362 of the hook portion 340 receives the flange 28. The mounting clip 310 may be initially attached at an angle, and later pulled into position after the flange 28 is received in the hook portion 340.

The mounting clip 310 may also include a clamp block 388 and a pad 390 that may be disposed on either side of the flange 28 in the receiving channel 362. When the flange 28 is received in the receiving channel 362 of the hook portion 340, one or more clamp blocks 388 may be located between the flange 28 and a lower surface 356 of the frame attaching portion 338, or between the flange and an upper surface 371 of the hook portion. The clamp block 388 may be any configuration or material that provides a friction fit between the mounting clip 310 and the frame 16. A pad 390 may also be located between the flange 28 and the mounting clip 310, or may be attached to the one of the upper surface 371 of the hook portion 340 or the lower surface 356 of the frame attaching portion 338. Once positioned, the fasteners 52 that are received in the fastener holes 342 can be tightened from an outboard location with respect to the frame rails 20.

The mounting clip 10, 110, 210, 310 and associated frame bracket 22 and body bracket 32 allows the manufacturer to fasten the mounting clip to the vehicle body 14 and to the frame 16 from outboard of the frame rails 20. In addition to increasing accessibility for the manufacturer, fastening the mounting clip 10, 110, 210, 310 from outboard of the frame rails 20 avoids interference with the truck components located inboard of the frame rails 20, such as the gas tanks, cross-members, suspension components and other components.

What is claimed is:

1. A mounting clip for attaching a vehicle body to a frame using a tool, the mounting clip comprising:
    a generally J-shaped body having a frame attaching portion configured to be attached to the vehicle body, and a hook portion extending from the frame attaching portion and configured to engage the frame;
    at least one fastener hole disposed on the frame attaching portion;
    a positioning formation disposed on the frame attaching portion, wherein the positioning formation is configured to receive a tool, wherein the positioning formation is an opening through the frame attaching portion, wherein the tool moves the mounting clip between a first position and a second position.

2. The mounting clip of claim 1 further comprising a plurality of fastener holes on the frame attaching portion.

3. The mounting clip of claim 1 wherein the hook portion includes a generally curved segment.

4. The mounting clip of claim 1 further comprising at least one pad disposed on the frame attaching surface.

5. The mounting clip of claim 1 further comprising at least one pad disposed on the hook portion.

6. The mounting clip of claim 1 further comprising a plurality of pads disposed on the mounting clip, wherein at least one pad is formed of a material having a higher durometer than another pad.

* * * * *